United States Patent [19]

Barkouskie

[11] Patent Number: 5,022,573
[45] Date of Patent: * Jun. 11, 1991

[54] SPARE TIRE RACK

[75] Inventor: Ronnie Barkouskie, Mexia, Tex.

[73] Assignee: Dutton-Lainson Company, Hastings, Nebr.

[*] Notice: The portion of the term of this patent subsequent to Dec. 5, 2006 has been disclaimed.

[21] Appl. No.: 379,416

[22] Filed: Jul. 13, 1989

Related U.S. Application Data

[63] Continuation-in-part of Ser. No. 169,490, Mar. 17, 1988, Pat. No. 4,884,729.

[51] Int. Cl.$^5$ .............................................. B62D 43/00
[52] U.S. Cl. ................................ 224/42.21; 224/42.23; 224/42.25
[58] Field of Search .............. 224/42.21, 42.23, 42.28, 224/42.06, 42.41, 42.25; 414/463, 465, 917, 466; 296/37.2; 254/375, 356

[56] References Cited

U.S. PATENT DOCUMENTS

| | | | |
|---|---|---|---|
| 930,410 | 8/1909 | Noonan | 224/42.44 |
| 1,168,066 | 1/1916 | Girardot | 224/42.25 |
| 1,609,440 | 12/1926 | Szydlowski | 224/42.25 |
| 2,674,393 | 4/1954 | Clark | 414/465 |
| 3,539,152 | 11/1970 | Paul | 224/42.23 |
| 3,822,814 | 7/1974 | Baldi | 224/42.25 |
| 3,831,793 | 8/1974 | Eller | 224/42.21 |
| 4,072,258 | 2/1978 | Cruson | 414/463 |
| 4,087,032 | 5/1978 | Miller et al. | 296/37.2 |
| 4,221,321 | 9/1980 | Wertjes | 224/42.21 |
| 4,522,325 | 6/1985 | McMillan | 224/42.23 |
| 4,795,302 | 1/1989 | Dalton . | |

Primary Examiner—Linda J. Sholl
Attorney, Agent, or Firm—Allegretti & Witcoff, Ltd.

[57] ABSTRACT

An improved tire rack (10, 100) is disclosed for use on any vehicle, but which is particularly suitable for use on a pickup truck (12). Brackets (24, 26 or 130, 131) are mounted on the frame members of the truck and support a rod (28) and arms (32, 36 or 102, 104) for pivotal motion between a storage position and a release position. In the storage position, the spare tire is held horizontally against the bottom of the bed of the truck. When moved to the release position by rotating a worm gear (72) to pivot the sector gear (66) on the rod (28), the tire rack moves the spare tire below and behind the bumper of the vehicle for ready access.

17 Claims, 4 Drawing Sheets

SPARE TIRE RACK

CROSS REFERENCE TO RELATED APPLICATIONS

This application is a continuation-in-part of U.S. Pat. Application Ser. No. 169,490, filed Mar. 17, 1988 now U.S. Pat. No. 4,884,729.

TECHNICAL FIELD

This invention relates to vehicles, and particularly to a mechanism for storing and deploying a spare tire mounted on the vehicle.

BACKGROUND OF THE INVENTION

Virtually every vehicle in use today carries a spare tire for emergency purposes. A great many techniques have been used to store the spare tire within the vehicle, often without any concern to the convenience or ease of removing the tire for use. This lack of concern exists even though the very need for use of the spare implies an emergency situation has arisen where one of the tires on the vehicle has failed. Unfortunately, tires often fail in inconvenient locations and in inclement weather, situations which compound the difficulty of tire retrieval.

A number of attempts have been made in the past to simplify access to the stored spare tire. However, many of these designs are so complex as to be simply impracticable. Vehicle manufacturers are resistant to complicated mechanisms which are expensive to manufacture. Further the complexity of a device often decreases its reliability.

The problem of retrieving the spare tire is amplified when considering a vehicle such as a pickup, or other truck. The spare wheel can be very heavy and awkward for anyone. Even a spare tire used on a common passenger car can be quite difficult for an elderly or weaker person to work with.

Therefore, a need exists for a more effective way of storing and retrieving a spare tire within a vehicle which does not require the exertion of an extraordinary effort to retrieve the tire when needed.

SUMMARY OF THE INVENTION

In accordance with one aspect of the present invention, a spare tire rack is provided for holding a spare tire on a vehicle having parallel frame members. The rack includes first and second brackets, each mounted on one of the parallel frame members. A rod is pivotally supported between the first and second brackets for pivotal motion about a horizontal axis. A first arm, having an inner end and an outer end, is secured at its inner end to the rod proximate the first bracket. A second arm, also having an inner end and an outer end, is fastened at its inner end to the rod proximate the second bracket. A cross piece is pivotally connected between the first and second arms at their outer ends for limited pivotal motion relative to the arms, limited by a stop on one of the arms.

The arms, rod and cross piece form a movable section. Structure is provided for pivoting the movable section relative to the brackets between a storage position and a release position. The cross piece pivots against the stop proximate the storage position to store the tire horizontally while pivoting relative to the arms as the movable section moves to the release position to provide easy access to the tire. In accordance with another aspect of the present invention, the spare tire is held in the storage position between the cross piece and the rod. In accordance with another aspect of the present invention, the brackets are mounted underneath the vehicle proximate a bumper. As the movable section pivots to the release position, the spare tire is moved from under the vehicle, below the bumper to a position beyond the bumper for easy access to the tire.

In accordance with another aspect of the present invention, the pivoting structure includes a sector gear mounted on the rod proximate the first bracket. The second arm may be shorter than the first arm to compensate for the elastic twisting of the rod to ensure that the tire is essentially level in the storage position. The tire also tilts downwardly as it moves away from the storage position which permits the tire to be removed from the rack without moving the rack completely to the release position. In the release position, the tire is directed upwardly for ease of access.

In accordance with another aspect of the present invention, the first and second arms are straight. The arms can be formed in two pieces, with structure to fasten them together to form the arm. The fastening structure permits the adjustment of the position of one piece relative to the other to adjust the distance between the inner and outer ends of the arm.

BRIEF DESCRIPTION OF THE DRAWINGS

For a more complete understanding of the present invention, and the advantages thereof, reference is now made to the following description, taken in conjunction with the accompanying drawings, in which.

DETAILED DESCRIPTION

Figure 1:
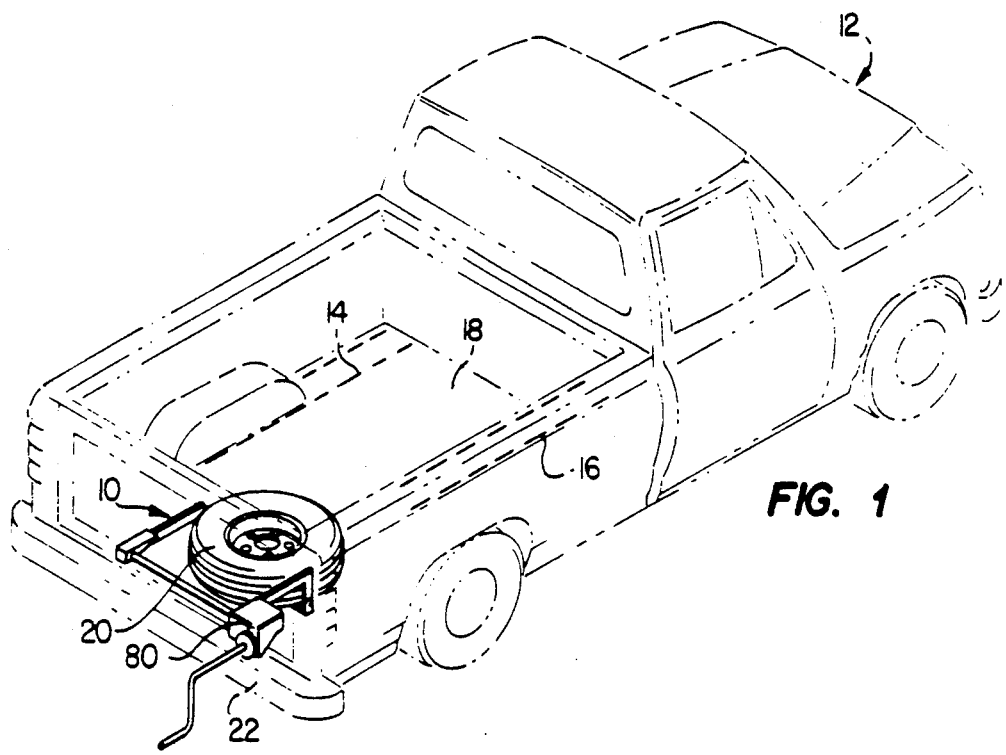
FIG. 1 is a perspective view of a tire rack forming a first embodiment of the present invention mounted on a pickup truck.

With reference now to FIG. 1, a tire rack 10 forming a first embodiment of the present invention is illustrated mounted on a pickup truck 12. The truck is of conventional construction, having a pair of parallel frame members 14 and 16 extending along the length of the vehicle on opposite sides of the center line of the vehicle. A truck bed 18 is supported on the frame members. In the storage position, the tire rack 10 holds the spare tire 20 against the bottom of the truck bed 18 between the frame members 14 and 16, providing excellent ground clearance (see FIG. 3D). When moved to the release position, the tire 20 has been lowered to ground level, moved behind the bumper 22 of the truck and tilted somewhat upwardly for ease of removal of the spare tire (see FIG. 3A).

Figure 2:
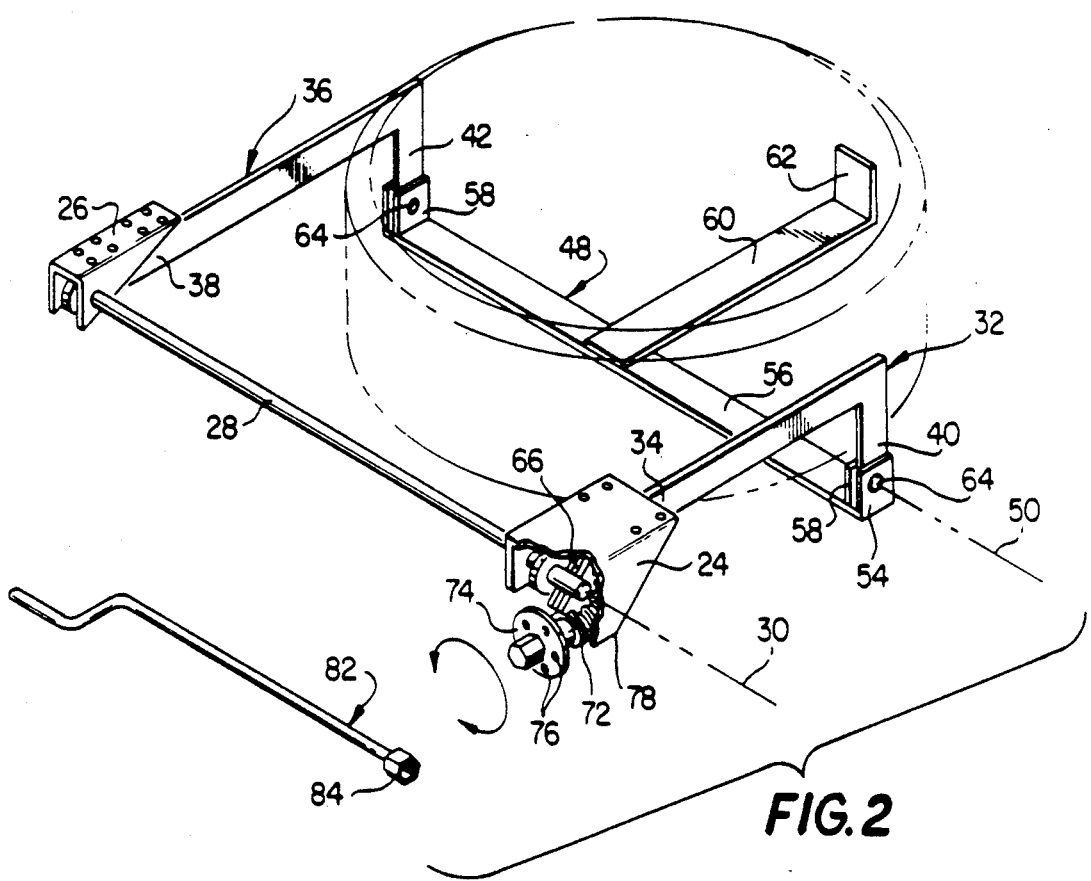
FIG. 2 is a perspective view of the tire rack.

With reference now to FIGS. 2 and 3, details of the tire rack 10 will be described. The rack includes first and second brackets 24 and 26. Each bracket is mounted on one of the frame members of the truck. A rod 28 extends between the brackets and is mounted to the brackets for pivotal motion about a horizontal axis 30 which is generally perpendicular the center line of the truck. A first L-shaped arm 32 is secured to the rod at the inner end 34 of the arm proximate the first bracket. A second arm 36 is secured to the rod near the inner end 38 of the second arm. Again, second arm 36 is L-shaped as well. The outer end 40 of first arm 32 and outer end 42 of second arm 36 both form the shorter section of the L-shape for each arm. As will be clear from FIG. 3, one corner 44 of each outer end is rounded while the other corner 46 is formed by a sharp angle.

A cross piece 48 extends between the outer ends of the arms 32,36 and is pivoted to the arms 32,36 for pivotal motion about a horizontal axis 50. The cross piece 48 is comprised of member 52 having welded or upturned ends 54, with spaced brackets or ends 58, and a tongue 60 having a upturned end 62. As can be seen from the drawings, ends 54 and 58 are paired and separated just far enough to permit the outer end of an arm 32,36 to pass between and be pivoted thereto with pins 64 lying on axis 50. The cross piece 48 can pivot about axis 50 relative to the arms 32,36 until a portion of the angle member 52 contacts the edge of the surface or sharp corners 46 of the arms as shown in FIG. 3C.

Figure 4:
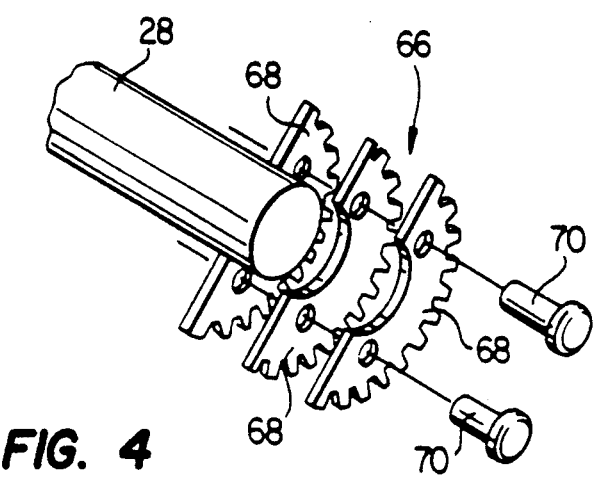
FIG. 4 is an exploded perspective view of the sector gear used in the tire rack.

At the end of rod 28 proximate the first bracket 24, a sector gear 66 is mounted. As best seen in FIG. 4, the sector gear 66 is constructed of three individual gear pieces 68 bolted together by bolts 70 to form the complete gear 66. This assembly permits the gear pieces 68 to be stamped out of a sheet of metal without expensive gear cutting machines, but permits a strong gear to be formed by a placing multiple sections together to form a single, larger gear.

Figure 2A:
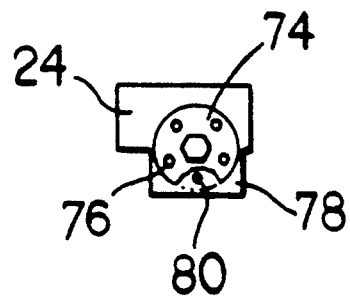
FIG. 2A is a front plan view of the locking plate and cooperative bracket for the tire rack of FIG. 2.

A worm gear 72 is mounted for rotation on the first bracket 24 and engages the teeth of the sector gear 66. A locking plate 74 is mounted at one end of the gear 72 and has a plurality of holes 76 about its circumference. A bracket 78 is mounted on the first bracket 24 so that a hole 76 in plate 74 can be aligned with a hole 80 formed in the bracket 78 as shown in FIG. 2A. A combination or key padlock can be passed through the aligned holes to lock the tire rack in the storage position.

A handle 82 with a shaped end 84 can be attached to the worm gear 72 to rotate the worm gear. The handle can be removably attached to the worm gear, or permanently mounted thereto as desired.

Figure 3A:
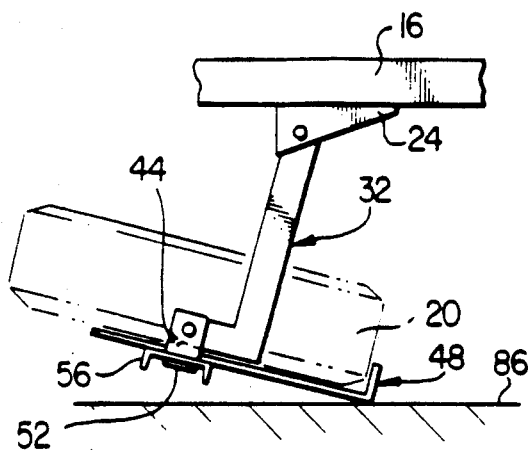
FIGS. 3A-D illustrate the operation of the tire rack as it is moved between the storage and release positions.
Figure 3B:
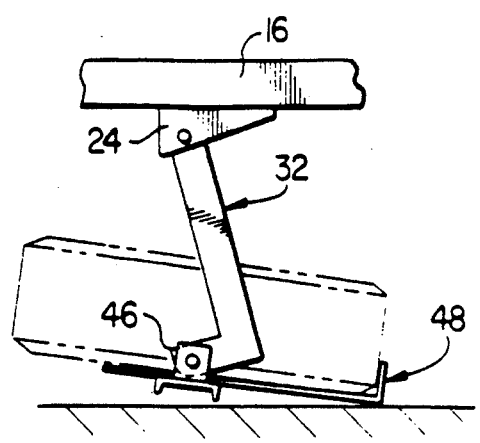
Figure 3C:
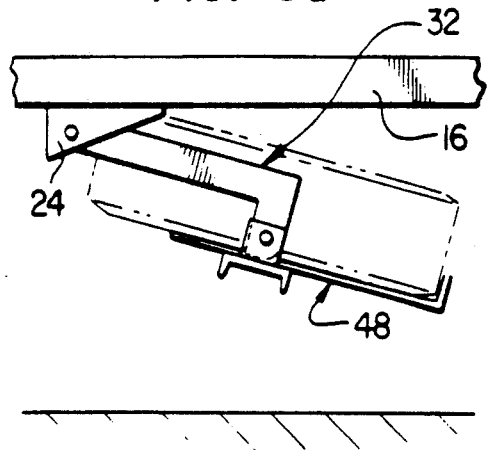

With reference now specifically to FIGS. 3A-D, the operation of the tire rack will be described. FIG. 3A illustrates the tire rack moved to the release position where the spare tire 20 can be easily pulled from the rack. When the tire is to be replaced, it is slid over the top of cross piece 48 so that the front portion of the tire contacts the end 62. The end 62 is positioned so that the center of mass of the tire and bracket lies forward of the axis 50, or to the right of axis 50 as shown in FIGS. 3A-D. The center of mass of the cross piece 48 without a tire resting on it also falls forward of the axis 50 so that the bottom of tongue 60 near the end 62 lies on the ground 86 when the rack is in the release position whether carrying a tire or not.

To move the spare tire to the storage position, of FIG. 3B, wherein the tire 20 is retained against frame cross members or the bottom of the truck bed 18 the operator simply engages the handle 82 with the worm gear 72 and begins to rotate the worm gear. The worm gear, in turn, rotates sector gear 66 and rod 28 in the counter clockwise direction as shown in the FIGURE, with the arms pivoting about axis 50 relative to the cross piece with a portion of the cross piece still resting on the ground.

As shown in FIG. 3C, the arms will eventually pivot about axis 50 to the point where the sharp corners 46 of each arm contact the angle member 52. Pivotal motion of the arms relative to the cross piece is then no longer possible as the rack continues to be cranked to the storage position. In the position shown in FIG. 3C, the tire is tilted slighted down toward the front end, or right in the FIGURE.

However, if the vehicle is positioned so that there is insufficient clearance to fully move the rack to the release position, the cross piece 48 and tire 20 can be manually pivoted to tilt the tire the opposite way to slide the tire out of the rack.

Figure 3D:
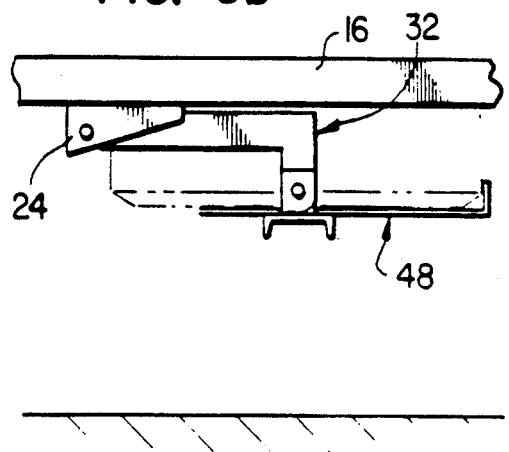

As the worm gear continues to rotate, the back end, or left side of the tire in FIG. 3D, hits the bottom of the truck bed 18 and causes the tire and cross piece 48 to pivot slightly so that the tire ends up in the storage position essentially flat and pressed against the underside of the truck bed. The shorter portion of the second arm 36 is preferably somewhat shorter than the shorter portion of the first arm 32 to compensate for elastic twisting of the rod 28 resulting from the proximity of the sector gear near the first arm to provide a uniform holding force across the width of the tire and truck bed.

Deployment of the spare tire essentially operates in the reverse manner. It should be noted that the back end, or left side, of the tire as shown in FIGS. 3A-D passes beneath and behind the bumper 22 of the truck. This eliminates the need for the operator to reach beneath the truck to get the spare tire, making the task far easier. The pitch of the worm gear 72 and sector gear 66 is preferably such that the rack will be selfheld within a particular position with no need for any locking structure.

One rack constructed in accordance with the teachings of the present invention employed a rod 28 having a one inch diameter. The length of the shorter leg of the L-shaped arm 36 was one-half inch less than the length of the shorter leg of the first arm to compensate for the elastic twisting of the rod. The sector gear 66 was formed of three pieces, each having a one-eighth inch thickness bolted together to form a sector gear having a thickness of three-eighths inch.

Figure 5:
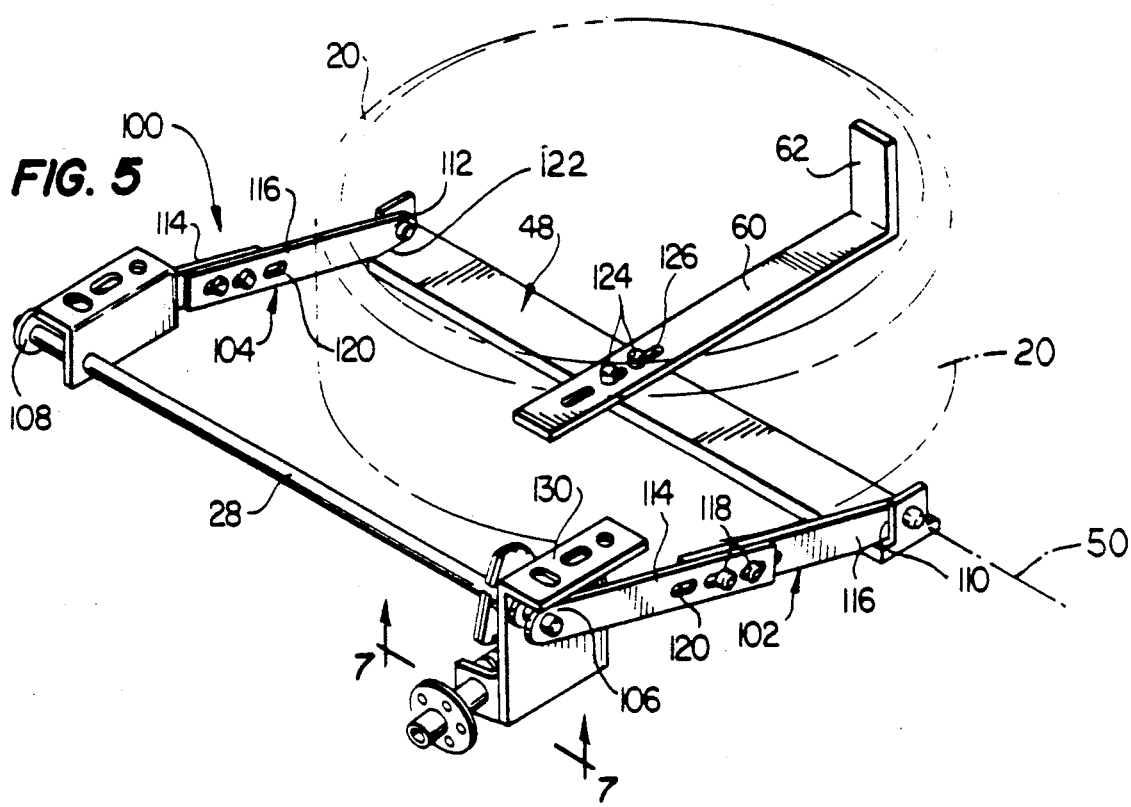
FIG. 5 is a perspective view of a tire rack forming a first modification of the tire rack of FIG. 1.
Figure 6:
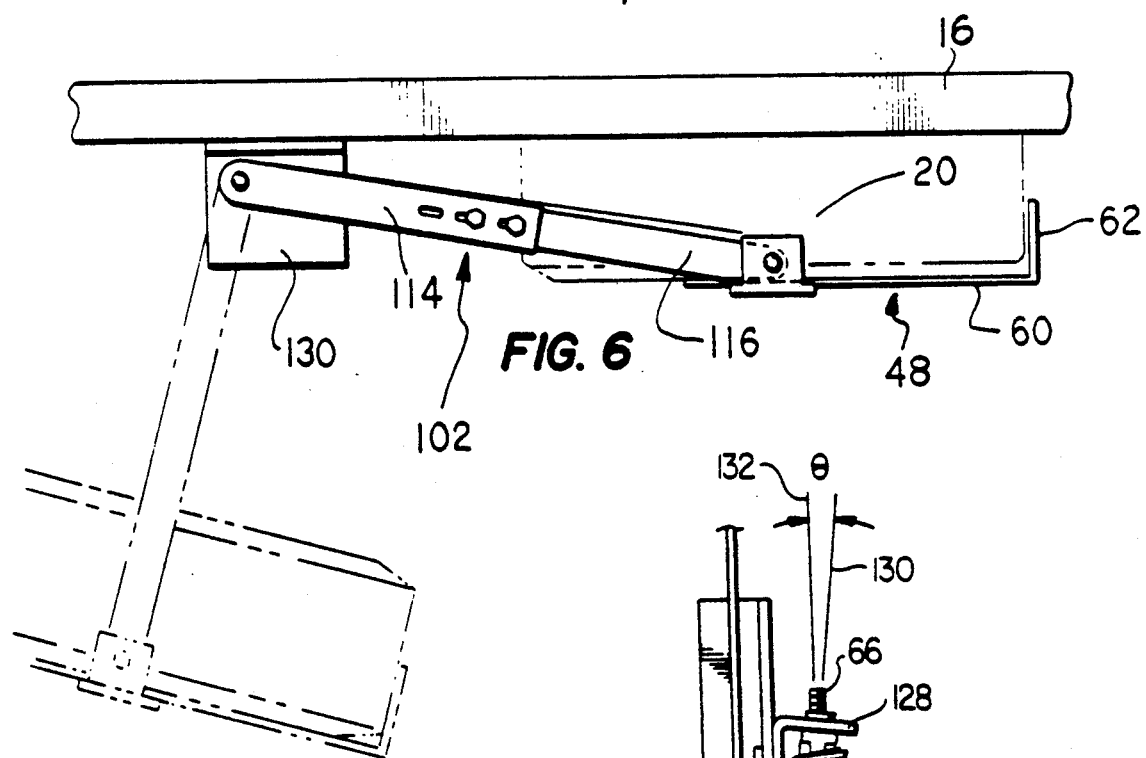
FIG. 6 is a side view of the tire rack of FIG. 5.
Figure 7:
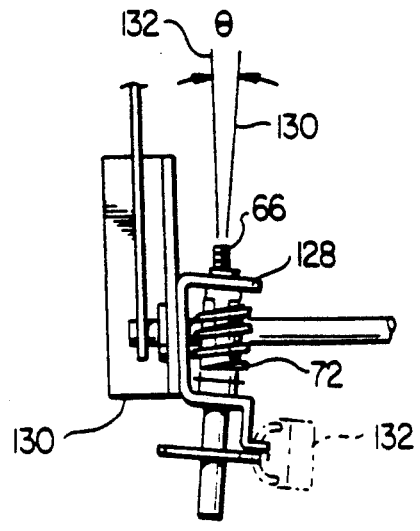
FIG. 7 is a detail view of the tire rack of FIG. 5 illustrating the worm gear mechanism.

FIGS. 5-7 illustrate a tire rack 100 forming a first modification of tire rack 10. The principles of operation of tire rack 100 are substantially identical to those of tire rack 10, but several modifications have been made as will be discussed hereinafter.

Tire rack 100 has a first arm 102 and a second arm 104 which are straight, as opposed to the L-shape of arms 32 and 36 described previously. The inner ends 106 and 108 of arms 102 and 104, respectively, are attached to rod 28. Rod 28 pivots between brackets 130 and 131. The outer ends 110 and 112 of arms 102 and 104, respectively, are pivoted to the cross piece 48, in a manner similar to arms 32 and 36.

However, each arm 102 and 104 is made up of two pieces, inner piece 114, and outer piece 116, secured together by fasteners 118. As can be seen in the Figures, both pieces 114 and 116 have a plurality of apertures 120 for receiving the fasteners 118. The apertures 120 on at least one of the pieces, and possibly both are elongated in the direction of the length of the pieces. Thus, the distance between the inner end and outer end of each of the arms can be adjusted and selected by sliding the inner piece and outer piece of each arm relative to each other and fastening the pieces together with fasteners 118 at the desired position. Thus, the pieces 114 and 116 for each arm can be made identically and interchangeably, with the desired slight difference in the length of each arm simply achieved by adjusting the pieces prior to fastening as needed. The outer end of outer piece 116 will include a surface 122 to cooperate with the cross piece 48 in the same manner as corner 46 of arms 32 and 36.

The tongue 60 can also be seen to be adjustably attached to cross piece 48 with fasteners 124. This permits the tire rack 100 to be adjusted to the particular tire size employed. As with arms 102 and 104, at least tongue 60, or cross piece 48, (or both) is provided with apertures 126 elongated in the direction to provide adjustment between the position of end 62 and axis 50 to provide the adjustability.

FIG. 7 illustrates a modified mounting for the worm gear 72 in a bracket 128 which is secured to a bracket 130 bolted to the beam 16. As previously, a lock 132 can be used to lock the worm gear 72 in a set position to prevent theft of the tire. An angle θ is established by the bracket 128 between the center line 130 of the worm gear 72 and the line 132 representing the plane of the sector gear 66 so that the gears 72, 66 properly mesh. The mechanism is self-locking and will not move of its own accord due to fiction.

While one embodiment of the present invention has been illustrated in the accompanying drawings, and described in the foregoing Detailed Description, it will be understood that the invention is not limited to the embodiment disclosed, but is capable of numerous rearrangements, modifications and substitutions of parts and elements without departing from the spirit of the invention.

I claim:

1. A spare tire rack for holding a spare tire on a vehicle having parallel frame members, comprising:
   a first bracket mounted to a first of said frame members;
   a second bracket mounted to the other of said frame members;
   a movable section including:
   (a) a rod pivotally supported between said first and second brackets for pivotal motion about a horizontal axis;
   (b) a first arm having an inner end and an outer end, said first arm secured at its inner end to the rod proximate the first bracket, the first arm formed of an inner piece, an outer piece and means to adjustable secure the pieces together to establish a first selected distance between the inner and outer end of the first arm;
   (c) a second arm having an inner end and an outer end, said second arm secured at its inner end to the rod proximate the second bracket, the second arm formed of an inner piece, an outer piece and means to adjustably secure the pieces together to establish a second selected distance between the inner end and outer end of the second arm;
   (d) a cross piece pivotally connected between said first and second arms at the outer ends thereof for limited pivotal motion, and for supporting a spare tire, a stop formed on at least one of said arms to limit the motion of the spare tire resting on the cross piece; and
   means for pivoting said movable section between a storage position proximate the parallel frame members and a release position, the cross piece pivoting against the stop proximate the storage position to store the tire horizontally, said cross piece pivoting relative to said first and second arms as the movable section moves to the release position to provide easy access to the spare tire.

2. The spare tire rack of claim 1 wherein the spare tire is securely held between the rod and cross piece in the storage position.

3. The spare tire rack of claim 1 wherein the parallel frame members define a cavity therebetween, the spare tire positioned in the cavity in the storage position.

4. The spare tire rack of claim 1 wherein said second selected distance is shorter than said first selected distance to compensate for elastic twisting of the rod as it is pivoted by said means for pivoting to store the tire in a horizontal position.

5. The spare tire rack of claim 1 in combination with a vehicle of the type having a rear bumper wherein the bumper is mounted at the ends of the parallel frame members, and wherein said first and second brackets are mounted proximate the bumper so that the spare tire is positioned adjacent to the bumper and between the frame members in the storage position, said spare tire being moved beneath and away from the bumper when moved to the release position.

6. The spare tire rack of claim 1 wherein the cross piece pivots as the movable section with the tire is moved contacts the ground in the release position for easy access.

7. The spare tire of claim 1 wherein the vehicle defines a cavity between said parallel frame members and a floor supported on said frame members, the spare tire being urged against the floor in the storage position.

8. The spare tire rack of claim 1 wherein said means for pivoting include a sector gear mounted on said rod proximate the first bracket, a third bracket secured to the first bracket, and a worm gear mounted on a third bracket, a third bracket, the worm gear engaging said sector gear.

9. The spare tire rack of claim 1 further comprising a tongue having an end to contact and confirm the tire, and means to adjustably mount the tongue on the cross piece to vary the distance between the axis of pivotal motion of the cross piece on the arms and the end to adapt the tire rack to different tire sizes.

10. The spare tire rack of claim 1 wherein the first and second arms are straight.

11. A spare tire rack for holding a spare tire on a pickup truck having parallel frame members with a cavity therebetween to store the spare tire, a truck bed supported on the parallel frame members, comprising:
   a first bracket mounted to a first of said frame members;
   a second bracket mounted to the other of said frame members;
   a movable section, including:
   (a) a rod pivotally mounted between said first and second brackets for pivotal motion about a horizontal axis;
   (b) a first straight arm having an inner end and an outer end, its inner end fastened to the rod proximate the first bracket, the first arm formed of an inner piece, an outer piece and means to adjustably secure the pieces together to establish a first selected distance between the inner end and outer end of the first arm;

(c) a second straight arm having an inner end and an outer end, said second arm secured at its inner end to the rod proximate the second bracket, the second arm formed of an inner piece, an outer piece and means to adjustably secure the pieces together to establish a second selected distance between the inner end and outer end of the second arm, the second selected distance being shorter than the first selected distance;

(d) a cross piece pivotally connected to said first and second arms at the outer ends thereof for limited pivotal motion about a horizontal axis, the spare tire resting on the cross piece, one corner of the outer end of each arm forming a stop to limit the pivotal motion of the cross piece; and a gear drive means for pivoting said movable section through the rod between a storage position, to store the spare tire between the frame members against the bottom of the truck bed, and a release position, with the spare tire positioned for ready access, the corners on said arms forming a stop limiting the pivotal motion of the cross piece as the movable section approaches the storage position to situate the spare tire horizontally against the bottom of the truck bed.

12. An improved spare tire rack for supporting a spare vehicle tire underneath the frame of the vehicle in a horizontal storage position, said spare tire rack also capable of shifting the spare tire from a horizontal storage position to a release position generally downward and away from the vehicle frame, said rack comprising, in combination:

first and second spaced brackets, each bracket including means for attachment to the lower side of the frame of the vehicle, a pivot rod journaled to the first and second brackets;

first and second generally parallel, spaced support arms; each having an inner end and outer end, said inner ends of the arms being fastened to the rod and pivotal therewith a tire support cross member piece pivotally connected to the support arms at the outer ends;

at least one of said arms including a stop means cooperative with the tire support cross piece for limiting pivotal movement of the cross piece relative to the arms; and means for pivoting the pivot rod about its axis to move the arms and cross piece between the tire storage position and a release position to provide easy access to the spare tire.

13. The improved rack of claim 12 wherein the cross piece comprises a lateral support piece extending between the support arms and connected thereto and a tongue member, perpendicularly connected to the lateral support piece and extending away from the pivot axis of the pivot rod for supporting a tire, whereby the center of mass of the tire mounted thereon is displaced from the cross piece and away from the pivot axis connection of the pivot rod when the rack is in the storage position and thereafter shifts so that the cross piece rotates to release the tire.

14. The improved rack of claim 12 wherein the means for pivoting comprise a gear mounted on the pivot rod cooperative with a drive gear mounted on one of the brackets and further including means to drive the drive gear.

15. The improved rack of claim 14 including means for locking the drive gear.

16. The improved rack of claim 15 wherein the means for locking the drive gear comprises:

(a) a lock plate mounted generally coaxially with the drive gear, said lock plate including at least one opening about its circumference and (b) a lock bracket supported by one of the spaced brackets, said lock bracket generally aligned in opposed relation, and proximate, to the lock plate to interfere with a locking member that extends through one of the lock plate openings to restrict the rotation of the rod and lock plate combination and thus lock the drive gear.

17. The improved rack of claim 15 wherein the means for locking the drive gear comprises (a) a lock plate mounted generally coaxially with the drive gear, said lock plate including at least one opening about its circumference;

(b) an L shaped bracket supported by one of the spaced brackets, one leg of said L shaped bracket aligned generally parallel to the plane of the lock plate, said leg having at least one hole generally alignable with the lock plate hole, whereby a locking member is fed through the aligned holes of the plate and L shaped bracket to secure the plate and bracket in a fixed position, and thus locking the drive gear.

* * * * *